Figure 14:
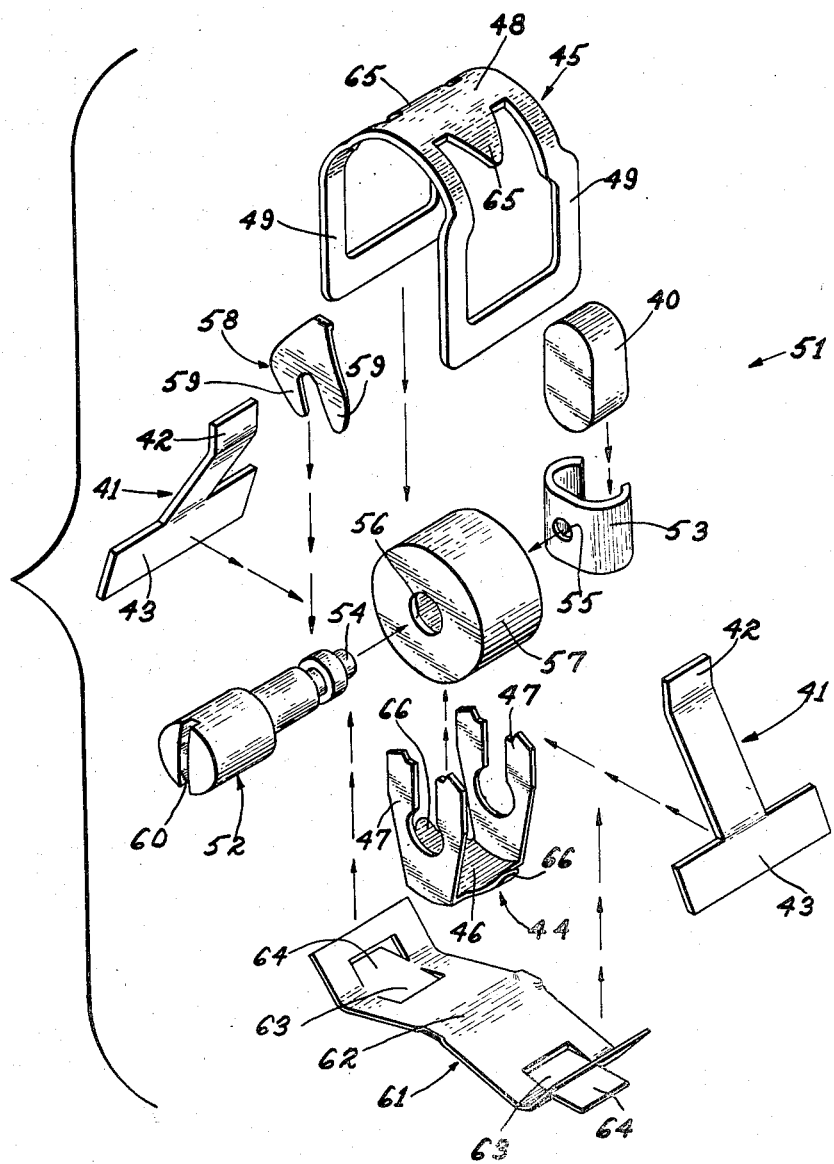

July 5, 1960  W. E. HULL  2,943,398
MAGNETIC COMPASS
Filed Feb. 15, 1956  5 Sheets-Sheet 1
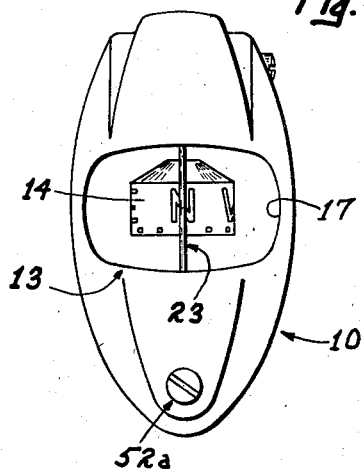
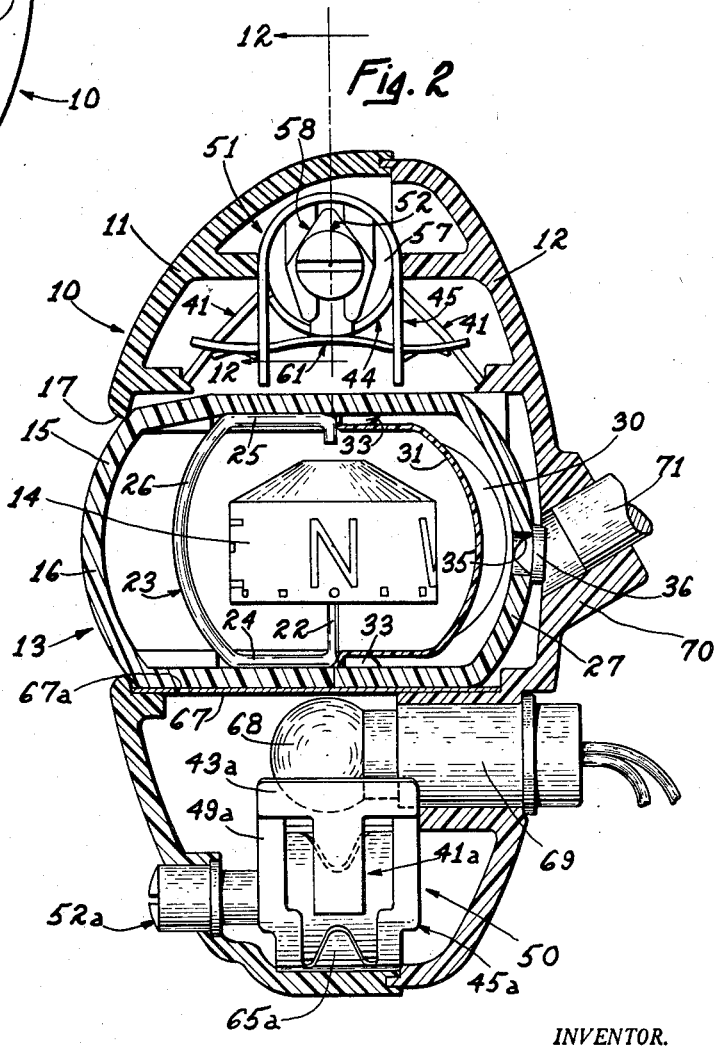
INVENTOR.
WALTER E. HULL
BY
ATTORNEY July 5, 1960 W. E. HULL 2,943,398
MAGNETIC COMPASS
Filed Feb. 15, 1956 5 Sheets-Sheet 2
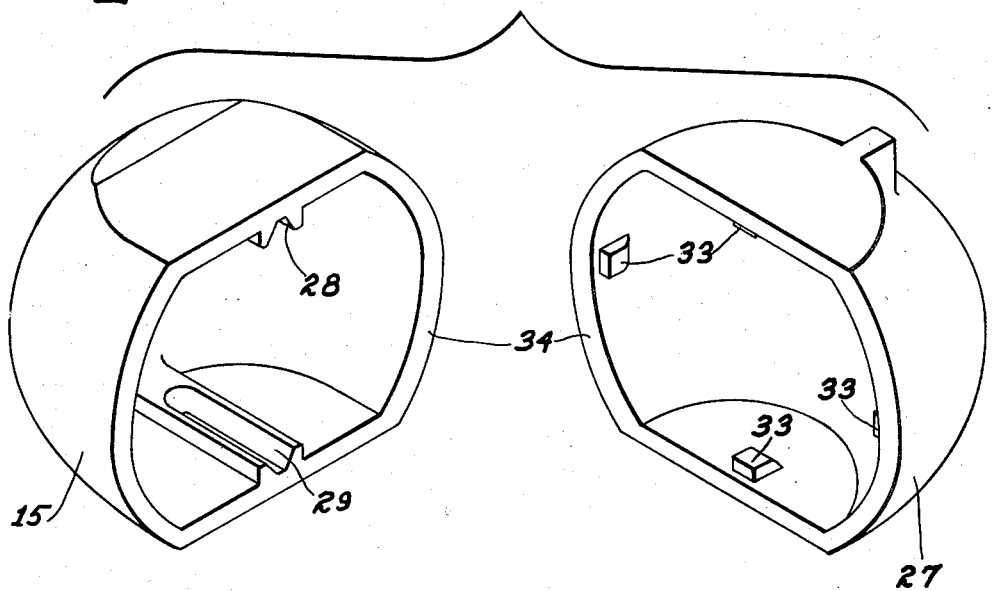
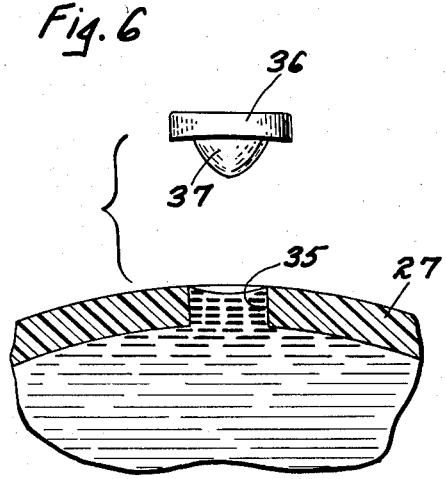
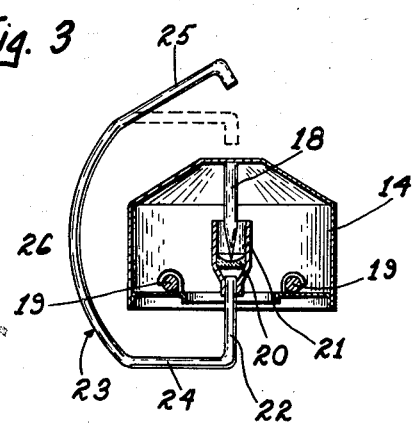
INVENTOR.
WALTER E. HULL
BY
ATTORNEY July 5, 1960 W. E. HULL 2,943,398
MAGNETIC COMPASS
Filed Feb. 15, 1956 5 Sheets-Sheet 3
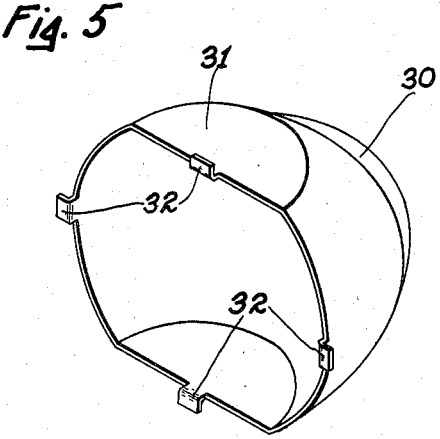
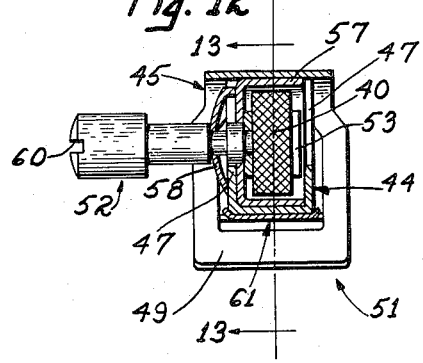
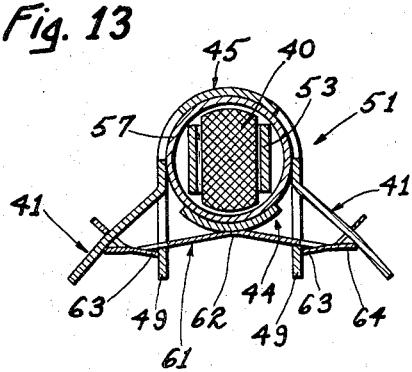
INVENTOR.
WALTER E. HULL
BY
ATTORNEY

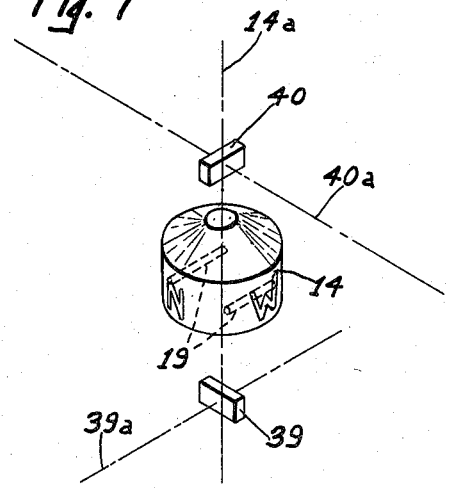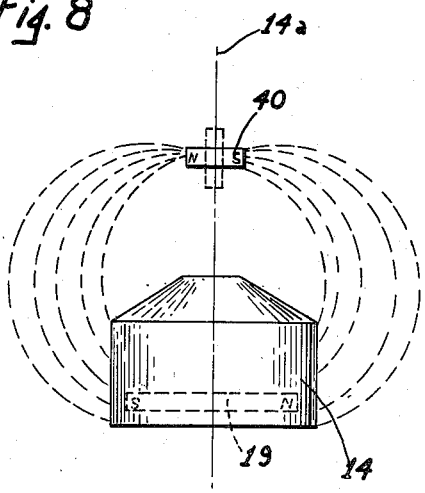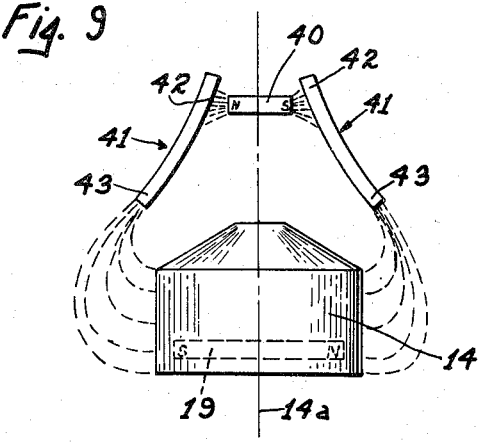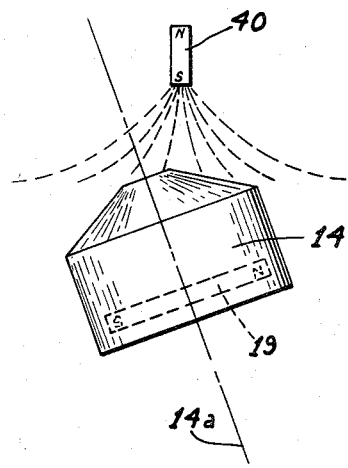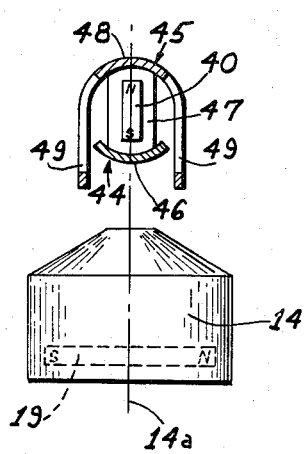

July 5, 1960  W. E. HULL  2,943,398
MAGNETIC COMPASS
Filed Feb. 15, 1956  5 Sheets-Sheet 5

INVENTOR.
WALTER E. HULL
BY
ATTORNEY

United States Patent Office 2,943,398
Patented July 5, 1960

2,943,398
MAGNETIC COMPASS
Walter E. Hull, Cortland, Ohio
(1011 High St. NE., Warren, Ohio)
Filed Feb. 15, 1956, Ser. No. 565,629
6 Claims. (Cl. 33—225)

The present invention relates to compasses, more particularly to magnetic compasses of the type suitable for use in boats, aircraft, motor vehicles and the like, and the principal object of the invention is to provide new and improved compasses of the character described.

It is a well-known phenomenon that when magnetic compasses are used in the presence of a local magnetic field, such as when they are used in motor vehicles and the like, the local field deflects the magnetic indicating member of the compass from its true magnetic reading. In order for a compass to accurately indicate magnetic headings when it is used in the presence of a local magnetic field, it is necessary to cancel the effect of such field upon the indicating member.

Prior art compasses have employed one or more compensating magnets for setting up a magnetic field which cancels the local magnetic field in the vicinity of the indicating member. However, these prior art constructions have been expensive, relatively inefficient and difficult for the average person to properly adjust.

In compasses of the type herein contemplated, there has been a long standing problem of providing for expansion and contraction of the dampening liquid which is contained within a sealed housing and in which the indicating member is immersed. Some prior art constructions employ a metal diaphragm which forms a part of the housing wall and which flexes to permit expansion and contraction of the liquid. Such constructions have not been entirely satisfactory because of the difficulty of obtaining a permanent seal between the housing and the diaphragm.

The present invention provides a compass which utilizes a simple, efficient and easily operated compensating mechanism to cancel out the effect of local magnetic fields upon the indicating member. The invention further provides a compass in which a simplified construction insures against leakage of the dampening liquid while providing for the necessary expansion and contraction thereof. Other advantages will readily become apparent from a study of the following description and from the drawings appended hereto.

In the drawings accompanying this specification and forming a part of this application there is shown for purpose of illustration an embodiment which the invention may assume, and in these drawings:

Figure 1 is a front elevational view of the improved compass,

Figure 2 is an enlarged side elevational view, the near side of the outer casing being removed to show the interior construction, Figure 3 is a sectional view of a detail prior to assembly, Figure 4 is a perspective view of two details prior to their assembly with each other, Figure 5 is a perspective view of another detail, Figure 6 is an enlarged, fragmentary sectional view of a detail, Figure 7 is a perspective diagrammatic view showing certain parts and their relationship with each other, Figure 8 is a diagrammatic elevational view of certain of the parts shown in Figure 7, Figure 9 is a view similar to Figure 8 but with certain parts added, Figure 10 is a view similar to Figure 8 but with the parts in a different relationship, Figure 11 is a view similar to Figure 10 but with certain parts added, Figure 12 is a sectional view generally corresponding to the line 12—12 of Figure 2, Figure 13 is a sectional view generally corresponding to the line 13—13 of Figure 12, and Figure 14 is an exploded perspective view of the assembly shown in Figures 12 and 13.

With reference to Figures 1 and 2, the present invention comprises an outer casing 10 of plastic or the like which encloses the compass mechanism. To facilitate assembly of the various parts, it is preferable to form the casing of a front portion 11 and a rear portion 12 which are adapted to be secured together by screws or the like, not shown.

Positioned substantially centrally of casing 10 is an assembly which comprises a housing 13 in which a compass card 14 is rotatably mounted. The front portion 15 of housing 13 is rounded at 16 and at least this portion of the housing is transparent so that the compass card may be seen through the housing wall. Front portion 11 of casing 10 is apertured at 17 to provide a window through which the front portion of housing 13 is visible. As will be apparent, rounded portion 16 of housing portion 15 magnifies compass card 14 and makes it appear larger, thus making the compass easier to read.

Compass card 14 is conventional in that it comprises an inverted cup of non-magnetic material having a central depending stud 18 (see Figure 3) whose lower end is tapered to provide a pivot. Card 14 has the usual magnets 19 secured thereto for making it responsive to the earth's magnetic lines of force and the exterior of the card carries the usual indicia.

As in conventional constructions, stud 18 rests in a concavity formed in the upper surface of a jewel 20 which is secured inside a sleeve 21. The lower end of sleeve 21 is soldered or otherwise secured to an upstanding portion 22 of a supporting member 23 which is non-magnetic and preferably somewhat resilient.

Supporting member 23 has a lower portion 24 which extends transversely of portion 22, an upper portion 25 which lies in substantially the same plane as portion 24, and an intermediate connecting portion 26. In the position of parts shown in full lines in Figure 3, portion 25 of supporting member 23 is spaced apart sufficiently from portion 24 that the compass card may be assembled, as shown, with the supporting member. However, as will later be disclosed, subsequent assembly operations will move portion 25 to and maintain it in the broken line position to prevent disassembly between the compass card and the supporting member. As will be understood, portion 26 serves not only to connect portions 24 and 25, but also serves as a lubber line.

As heretofore disclosed, compass card 14 is encased in a housing 13. This housing is substantially flat on top and bottom and as best seen in Figure 4, comprises the previously mentioned front portion 15 together with a rear portion 27. As will appear, these portions are adapted to be fused together to form the complete housing. The inside of housing portion 15 is formed to provide spaced, inwardly directed respective upper and lower grooves 28 and 29 for receiving the supporting member 23.

To assemble compass card 14 and supporting member 23 with housing portion 15, supporting member portion 25 will be sprung to its dot-dash line position shown in Figure 3 and the assembly then slid into housing portion 15 with supporting member portion 26 foremost. Supporting member portion 24 will be slid into groove 29 while portion 25 will be slid into groove 28. It is to be understood that the spacing between grooves 28, 29 is such that supporting member portion 25 will be held in the broken line position shown in Figure 3 and in the full line position shown in Figure 2. The resiliency of the supporting member will tightly wedge the supporting member and the housing portion 15 together as will be clear.

As in conventional constructions, housing 13 is adapted to be filled with suitable liquid to dampen oscillatory movement of the compass card. Means must be provided to permit expansion and contraction of the liquid as a result of changes in temperature. The simplest method of providing for such expansion and contraction is to only partially fill the housing so as to leave an air bubble therein. This, however, is unsatisfactory because the free air bubble creates the impression that some liquid has leaked from the housing. Many prior art constructions filled the housing completely, the expansion and contraction of the liquid being accommodated by a flexible metallic diaphragm which formed one wall of the housing.

The present invention provides a bubble of air or other compressible fluid within the housing; however, this bubble is positioned out of sight within the housing and maintained in such position. Broadly, the bubble is encased in a transparent, flexible envelope which is affixed in a predetermined position within the housing.

As best seen in Figures 2 and 5, a thin transparent membrane 30 of a suitable plastic or the like encloses the bubble. At the present time, membrane 30 is cemented to the exterior of a thin transparent body 31 which is configurated similar to housing portion 27 but which is smaller so as to fit therewithin. In order to maintain body 31 in position, it is formed with a plurality of ears 32 (herein shown to be four in number) which engage the interior of housing portion 27 and which also engage respective lugs 33 which project from the interior of this housing portion. Under certain circumstances it may be desirable to cement or otherwise secure membrane 30 directly to the inner wall of housing portion 27.

With the support member and compass card assembly positioned in housing portion 15 and with body 31 positioned in housing portion 27, faces 34 of the housing portions will be sealed together. In the present embodiment, one or both of the faces 34 will be moistened with a suitable liquid which softens the material. The faces will then be pressed together and held until the liquid evaporates and leaves the two housing portions fused together to provide a leakproof assembly. It will be seen in Figure 2 that after assembly, supporting member 23 assists in maintaining body 31 in position within the housing.

With housing portions 15, 27 fused together, the housing 13 provided thereby will be filled with the usual dampening liquid through an aperture 35 formed in housing portion 27. It is to be understood that the interior of the housing will be completely filled and that no free air bubble will be entrapped therein.

As illustrated in Figure 2, housing 13 is adapted to be closed by means of a cap 36, preferably formed of substantially the same material as is housing portion 27 and which overlies aperture 35. Referring to Figure 6, the underside of cap 36 is adapted to be moistened with a suitable softening liquid. The cap will then be pressed against the exterior of the housing portion, so as to overlie aperture 35, until the softening liquid evaporates. This will fuse the cap to the housing portion.

In order to insure that no air bubbles will be trapped beneath cap 36, the cap is provided with a tapered projection 37 which fits within aperture 35. As the cap is positioned in place, the projection will displace a quantity of fluid from the housing to insure that all air is displaced therefrom. Further, projection 37, as it enters the aperture, insures that cap 36 is properly positioned over the aperture.

It should be pointed out that a more dependable closure is obtained by fusing cap 36 to the exterior of the housing than by wedging a plug into the aperture as has been done in prior art devices. With the present construction, shrinkage of the housing or the cap will not result in leakage since any stresses imposed by such shrinkage will be spread over a relatively large area thus reducing the likelihood of separation between the housing and the cap.

With housing 13 assembled as heretofore described, a workable, accurate compass is provided. However, this compass would be accurate only when it is used in a locality which is free of local magnetic fields. In the event the compass is used adjacent a local magnetic field, for example, if it is used in an automobile or aircraft or the like, it is necessary to provide means for cancelling the local magnetic field in order for the compass to read accurately.

Stripped of its refinements, the construction herein employed to cancel out the aforesaid local magnetic field is shown in Figure 7 to comprise a pair of compensating magnets 39 and 40. Magnet 39 is positioned below compass card 14 and magnet 40 is positioned above the compass card. Each magnet is rotatable about respective axes 39a, 40a which intersect the pivotal axis 14a of the compass card 14 at an angle of ninety degrees. Since the present device is designed to operate best with axis 14a vertical, axes 39a, 40a are horizontal. For a purpose to become clear, axes 39a, 40a lie in planes which intersect each other at an angle of ninety degrees.

Figure 8 illustrates the operation of compensating magnet 40, it being understood that magnet 39 operates in a similar manner. With magnet 40 in the horizontal position shown, the majority of the lines of force of this magnet in the vicinity of magnets 19 of compass card 14 extend generally horizontally. In this position of magnet 40, there is a strong magnetic pull on the compass card tending to rotate it about axis 14a so that its magnets 19 are aligned with compensating magnet 40. When compensating magnet 40 is rotated to the vertical dot-dash line position shown, the lines of force will extend generally vertically and accordingly there will be no tendency to rotate compass card about axis 14a. Obviously, the effectiveness of compensating magnet 40 in rotating the compass card about its pivot can be varied by rotating magnet 40 about its axis 40a from a horizontal position of maximum effectiveness to a vertical position of minimum effectiveness.

Means are provided for increasing the effectiveness of the horizontal magnetic field of magnet 40. This is presently accomplished (see Figure 9) by providing a pair of pole pieces 41 of high magnetic permeability which have first portions 42 adjacent compensating magnet 40 and second portions 43 adjacent the compass card. These pole pieces, by channeling the magnetic lines of force of magnet 40 adjacent to the compass card, greatly increase the effectiveness of the magnet.

As before mentioned, when compensating magnet 40 is positioned vertically, its magnetic lines of force adjacent the compass card will extend generally vertically so that the compass card will not be rotated about its vertical axis. However, with magnet 40 thus positioned, complications of the following nature arise. As illustrated in Figure 10, the vertically positioned compensating magnet tends to attract one end of the compass card magnets 19 and to repel the other. This causes undesirable tilting of the compass card.

The present invention eliminates this undesirable tilting of the compass card by diverting, away from the card, the lines of force from the end of the compensating magnet closest to the card and by diverting, toward the card, the lines of force from the end of the compensating magnet furthest from the card.

Briefly, and with reference to Figure 11, this is accomplished by positioning a pair of U-shaped, magnetically permeable members 44, 45 about magnet 40. Bight portion 46 of member 44 intercepts the lines of force from the adjoining end of magnet 40 and legs 47 of this member direct such lines of force away from compass card 14. Bight portion 48 of member 45 intercepts the lines of force from the other end of magnet 40 and legs 49 of this member divert such lines of force toward the compass card. Members 44, 45 are so proportioned that the magnitude of the lines of force from each end of magnet 40 are substantially equal adjacent the compass card. Accordingly, with the lines of force from each end of the magnet balancing each other, there is no tendency to tilt the card in the manner illustrated in Figure 10.

As previously mentioned, compensating magnets 39 and 40 are adapted to be respectively positioned below and above compass card 14 (see Figure 7) and each of these magnets is carried by a respective assembly 50, 51 (see Figure 2). Since assemblies 50, 51 are similar (with exceptions later to be disclosed), only assembly 51 will be disclosed in detail. Since assemblies 50, 51 are similar, corresponding parts are identified by the same reference characters but with the suffix "a" added.

As best seen in Figures 12, 13 and 14, assembly 51 comprises magnet 40 which is secured to an adjusting shaft 52 by means of a clip 53. As herein disclosed, shaft 52 has a reduced-diameter end portion 54 which passes through an aperture 55 in clip 53 and is then peened over to lock the clip to the shaft. Shaft 52 passes through a central aperture 56 formed in the end wall of a cup-shaped member 57, it being clear (see Figures 12 and 13) that magnet 40 and clip 53 fit inside the cup member and are adapted to freely rotate therein with rotation of the shaft 52. It should be pointed out that shaft 52, clip 53 and cup member 57 are formed of a suitable non-magnetic material such as, for example, brass or aluminum.

Cup member 57 is adapted to fit within the previously mentioned U-shaped members 44, 45, legs 47 of member 44 being spaced to engage respective ends of the cup member. Each leg 47 is slotted to pass shaft 52, it being clear that with both legs slotted, member 44 may be assembled with the cup member so that either leg is adjacent the closed end of the cup member.

With U-shaped member 44 assembled with cup member 57, a spring clip 58 having spaced legs 59 which fit in an annular groove in shaft 52 will be assembled over the shaft to resiliently urge the shaft in a direction to frictionally engage clip 53 against the end wall of the cup member. The frictional engagement of clip 53 with the cup member holds shaft 52 against undesirable rotation but still permits it to be rotated, as by inserting a screw driver or the like in slot 60 of the shaft, when the position of magnet 40 is to be adjusted.

U-shaped member 45 fits over cup member 57 so that its bight portion 48 is diametrically opposed to bight portion 46 of member 44. Note that both legs 49 are open at the center for a purpose to appear. The foregoing parts of assembly 51 are adapted to be held together by means of a non-magnetic spring member 61 whose center portion 62 engages the bight of U-shaped member 44 and whose respective end portions extend through the open legs 49 of member 45.

In the position of parts as viewed in Figure 13, member 61 is adapted to be sprung in place so that its center portion 62 exerts an upward force on the bight of member 44 and whose end portions exert a downward force on respective legs 49 of member 45. Tabs 63 are struck from spring member 61, each tab engaging a respective leg 49 to prevent unintentional disassembly of the spring member. Further tabs 64 are struck from the ends of spring member 61 and respective ends are bent upwardly to provide respective openings for receiving respective pole pieces 41 which have their ends 42 positioned adjacent cup member 57. Portions 43 of pole pieces 41 are enlarged transversely, as shown in Figure 14, so as to spread out the magnetic lines of force of magnet 40 adjacent compass card 14 so that such lines of force will have a more even effect upon the compass card.

Means are provided to reduce the sensitivity of adjustment of compensating magnet 40 so that its transition from a vertical position to a horizontal position will have a more gradual effect on the compass card. In the present invention, substantially all of the lines of force of magnet 40 are entrapped and directed by U-shaped members 44, 45 when this magnet is vertical. However, as the magnet is rotated from its vertical position, the construction is such that progressively more and more magnetic lines of force are permitted to escape entrapment by members 44, 45.

To accomplish the foregoing and as best seen in Figure 14, tongues 65 extend from bight portion 48 of member 45 and are partially wrapped about cup member 57 so that they lie in the plane of rotation of magnet 40. These tongues each taper down from a maximum width adjacent bight portion 48. Bight portion 46 of member 44 is provided with tongues 66 which are similar to tongues 65. This construction provides for a gradual reduction in effectiveness of the members 44, 45 as the magnet is rotated from its vertical position to thereby render the adjustment of the magnet less sensitive.

As shown in Figure 2, assembly 51 is adapted to be positioned above housing 13 (in which compass card 14 is positioned) while assembly 50 is adapted to be positioned below this housing. The axes of shafts 52, 52a (about which respective compensating magnets 40, 39 are rotatable) are disposed at 90 degrees from each other and as herein disclosed, the axis of shaft 52a extends fore and aft of the compass while the axis of shaft 52 extends from side to side thereof. Note that assembly 50 is inverted with respect to assembly 51 so that legs 49a of member 45a and portions 43a of pole pieces 41a are positioned adjacent housing 13.

Because of the above mentioned inversion of assembly 50 and because this assembly is substantially entirely supported within front housing 11, it is not necessary to employ a spring clip to hold this assembly together.

Still referring to Figure 2, casing 13 rests upon an opaque plate 67. A light bulb 68, carried by a suitable socket 69 which is in turn carried by the rear portion 12 of outer casing 10, is positioned beneath plate 67. A plurality of suitable apertures 67a are formed in plate 67 to permit light from bulb 68 to escape to the interior of casing 13 so as to illuminate compass card 14 and lubber line 26. Note that with rear, outer casing portion 12 in place both assemblies 50, 51 will be securely held in position within outer casing 10 as will housing 13 in which the compass card is housed. The rear of casing portion 12 is provided with a boss 70 in which a suitable compass mounting stud 71 or the like is anchored.

With the present compass mounted within an automobile or the like so it faces the rear thereof, or in other words, so that the operator, when facing forward, looks as directly as possible into the front of the compass as shown in Figure 1, compensating the compass for the local magnetic field of the automobile will be as follows:

Both shafts 52, 52a of assemblies 51, 50 will be rotated so that their respective compensating magnets are in their zero or vertical positions. The automobile will then be headed toward magnetic North and shaft 52a rotated, if necessary, to cause the compass card to read North. The automobile will then be headed toward magnetic East and shaft 52 rotated, if necessary, to cause the compass card to read East. If desired, the automobile may be headed first North again and then East and the adjustments of the shafts refined for a more accurate setting. This will completely cancel the local magnetic field of the automobile and allow the compass to accurately indicate the vehicle's magnetic heading.

In view of the foregoing it will be apparent to those skilled in the art that I have accomplished at least the principal object of my invention and it will also be apparent to those skilled in the art that the embodiment herein described may be variously changed and modified, without department from the spirit of the invention, and that the invention is capable of uses and has advantages not herein specifically described, hence it will be appreciated that the herein disclosed embodiment is illustrative only, and that my invention is not limited thereto.

I claim:

1. For use with a compass having a magnetic member adapted to rotate in a horizontal plane about a vertical axis for alignment with the earth's magnetic field, a compensating device for neutralizing the effect upon said member of horizontal magnetic lines of force of local magnetic fields, comprising a bar magnet spaced vertically of said member and rotatable in a vertical plane about a horizontal axis from a horizontal position wherein the lines of force of its magnetic field adjacent said magnetic member extend generally horizontally for maximum neutralization of said lines of force of said local magnetic field to a vertical position wherein the lines of force of its magnetic field adjacent said magnetic member extend generally vertically for minimum neutralization of said lines of force of said local magnetic field, and means for neutralizing the vertical lines of force of the magnetic field of said magnet when the latter is in a vertical position to prevent tilting of said magnetic member from its horizontal plane by such field, said means comprising a first magnetically permeable member having a portion adjacent the near pole of said vertically positioned magnet for diverting the lines of force from such near pole away from said magnetic member and a second magnetically permeable member having a portion adjacent the far pole of said vertically positioned magnet for diverting the lines of force from such far pole toward said magnetic member, said member portions diverting the majority of the lines of force of said magnet when the latter is vertically positioned and said member portions having tapered extensions which project transversely of respective adjoining poles of said magnet when the latter is vertically positioned and which lie in the plane of magnet rotation so that the efficiency of said portions in diverting the lines of force of said magnet progressively decreases as the latter is rotated from its vertical position to reduce the rate at which the magnet's horizontal magnetic field is built up to thereby reduce the sensitivity of adjustment of said magnet.

2. For use with a compass having a magnetic member rotatable for orientation with the earth's magnetic field, a compensating device for neutralizing the effect upon said magnetic member of a local magnetic field comprising an elongated permanent magnet adjacent said magnetic member for exerting a force thereon opposite to that exerted by said local magnetic field, shield means surrounding said magnet to provide a closed flux path adjacent said magnet to selectively divert magnetic flux emanating therefrom through said path and away from said magnetic member, said shield means having diametrically opposed portions which in a first relative position of said shield means and said magnet align longitudinally of the magnet with respective poles of the latter to divert magnetic flux from said magnet through said path and away from said magnetic member, said shield means also having diametrically opposed openings which in a second relative position of said shield means and said magnet align longitudinally of the magnet with respective poles of the latter to provide for passage of magnetic flux from said magnet to said magnetic member for exerting a force upon the latter, and means for relatively shifting said shield means and said magnet between said first and second positions.

3. The construction of claim 2 wherein said shield means comprises a pair of U-shaped members positioned at right angles to each other with their bights providing said diametrically opposed portions and arranged with their open ends facing in opposite directions with the leg portions of one engaged with the bight portion of the other.

4. In a compass having a magnetic member rotatable in a circular path about a vertical axis for orientation with the earth's magnetic field, the combination of a compensating device for exerting on the magnetic member a magnetic force equal to but opposite that exerted thereon by local magnetic fields, said compensating device comprising an elongated rotatable permanent bar magnet spaced vertically of the magnetic member and of a length less than the diameter of the circular path of the latter, and a pair of pole pieces of high magnetic permeability having inner ends in spaced relation adjacent said magnet and outer ends adjacent the periphery of the circular path of said magnetic member, said pole pieces providing a low resistance path for the magnetic flux emanating from said magnet to increase its effectiveness in pulling said magnetic member, the inner end of each pole piece being substantially equal in transverse size to that of a respective adjoining end of said magnet and the outer end of each pole piece being materially larger in transverse size than its inner end, and means for rotating said magnet between said pole pieces to a position wherein its ends are aligned with said inner ends of said pole pieces to exert a maximum pull on said magnetic member and for rotating said magnet away from such position to reduce the pull exerted on said magnetic member.

5. The construction of claim 4 wherein each pole piece has a generally T-shaped configuration with the base of the T providing said inner end and with the transversely extending portion of the T providing said outer end.

6. The construction of claim 4 and further comprising shield means providing a closed flux path adjacent said magnet to divert the magnetic flux emanating from said magnet through said path and away from said magnetic member, said shield means having opposed portions which align longitudinally of the magnet with respective ends thereof when said magnet is out of alignment with said pole pieces to divert magnetic flux from said magnet through said shield means and away from said pole pieces and said magnetic member, said shield means also having opposed openings aligned longitudinally of the magnet with respective ends thereof when said magnet is aligned with said pole pieces to provide for passage therethrough of magnetic flux to said pole pieces and thence to said magnetic member.

References Cited in the file of this patent

UNITED STATES PATENTS

| | | |
|---|---|---|
| 1,024,370 | Smith | Apr. 23, 1912 |
| 1,840,133 | Salzgeber | Jan. 5, 1932 |
| 1,889,529 | Barroll | Nov. 29, 1932 |
| 2,054,318 | Gunn | Sept. 15, 1936 |
| 2,069,065 | Hand | Jan. 26, 1937 |
| 2,155,712 | Hull | Apr. 25, 1939 |
| 2,290,348 | Moule | July 21, 1942 |
| 2,417,864 | Dinsmore | Mar. 25, 1947 |
| 2,482,688 | Musal | Sept. 20, 1949 |
| 2,594,148 | Galbois | Apr. 22, 1952 |
| 2,677,895 | Formis | May 11, 1954 |